United States Patent [19]

Gray et al.

[11] Patent Number: 4,565,120
[45] Date of Patent: Jan. 21, 1986

[54] SAFETY RESTRAINT FOR BRAKE ACTUATORS

[75] Inventors: Kevin J. Gray; Bruce D. Sibley, both of Lawrence, Kans.

[73] Assignee: Aeroquip Corporation, Jackson, Mich.

[21] Appl. No.: 713,884

[22] Filed: Mar. 20, 1985

[51] Int. Cl.$^4$ .............................................. F01B 7/00
[52] U.S. Cl. .................................... 92/130 R; 92/63; 92/130 A; 92/169; 403/338
[58] Field of Search .................. 92/63, 130 A, 169 R, 92/130 R; 403/338, 344

[56] References Cited

U.S. PATENT DOCUMENTS 3,136,227  6/1964  Williams ................................. 92/63
3,515,438  6/1970  Stevenson et al. ...................... 92/63
3,935,620  2/1976  Carton .................................... 92/63

Primary Examiner—Paul E. Maslousky
Attorney, Agent, or Firm—Beaman & Beaman

[57] ABSTRACT

A safety restraint limiting the separation of brake actuator housings containing powerful compression springs. The restraint consists of a sheet metal body having a notch receiving the housing flanges, the notch being of sufficient dimension to permit partial separation of the housing flanges upon release of the flange clamp band, and the flange and restraint include engaging complementary surfaces which produce an inward force on the restraint when the restraint is subjected to axial spring forces thereby retaining the restraint notch in alignment with the housing flanges to limit axial separation thereof.

9 Claims, 5 Drawing Figures

SAFETY RESTRAINT FOR BRAKE ACTUATORS

BACKGROUND OF THE INVENTION

Vehicle brake actuators of the fluid type, utilizing compressed air, or subatmospheric pressures, usually consist of housings having sheet metal portions interconnected at outwardly extending flanges. Seals and diaphragms are often incorporated into the flnage interconnection, and the flanges may be held together by bolts or other fasteners, and many actuators utilize clamping bands to maintain the assembly of the housing portion flanges.

Many vehicle brake actuators utilize heavy duty compression springs for producing the motive forces of the brake, and in such brake actuator constructions the compression spring provides the braking force to render the brake "fail-safe" in the event of loss of compressed air, or the like.

The incorporation of heavy duty compression springs into brake actuators produces a hazardous safety problem during servicing. Special assembly equipment permits the actuators to be safely assembled under controlled conditions wherein the spring may be compressed by a take-up bolt as the housing portions are assembled. However, if the mechanic is inexperienced and does not use the take-up bolt properly, or if the clamp bands holding the actuator together become loose, the actuator end cap may be thrown from the bulkhead with great force.

The danger to the mechanic arising from the disassembly of a brake actuator housing containing a powerful compression spring in a compressed state is obvious. While the spring take-up bolt reduces the danger to the mechanic when disassembling a brake actuator, such safety devices as known are not as dependable as they should be, or require such a sequence of steps as to be difficult to follow by an inexperienced mechanic. Additionally, many safety devices require positive action by the mechanic to be rendered operable, and a mechanic unfamiliar with a particular type of brake actuator and safety apparatus may easily be injured.

It is an object of the invention to provide a low cost safety restraint for brake actuators utilizing compression springs wherein the safety restraint limits the separation of the actuator housing portions upon removal of the conventional clamping means.

Another object of the invention is to provide a low cost safety restraint for brake actuators which limits the separation of the actuator housing portions under the influence of internal springs, and the configuration of the restraint and the associated housing portion is such that the force of the actuator spring augments the forces necessary to maintain alignment of the restraint with the housing portions critical to the operative functioning of the restraint.

In the practice of the invention brake actuators using the restraint disclosed include housings, such as end caps, and the like, which each employ an outwardly extending flange at the connecting line of the housings. These flanges are maintained in an aligned relationship, often having a diaphragm periphery sandwiched therebetween, and drawn toward each other by clamping structure, such as bolts or a clamping band. In the disclosed embodiment a clamping band is employed. The band includes a plurality of circular segments, and at each end an outwardly extending ear includes a hole through which a bolt may be inserted. Two or more segments are employed to circumscribe the brake actuator and as the clamping band includes portions which confine the housing flanges as the band is constricted tightening of the bolts draws the housing flanges toward each other to maintain the actuator assembly.

The safety restraint in accord with the invention comprises planar metal bodies which are affixed to one of the housing portions, usually an end cap. In the disclosed embodiment the restraints include a tang which is received within a rectangular opening in the end cap, and the tang is staked or upset within the opening to attach the restraint to the actuator housing.

The safety restraint includes a notch of sufficient radial depth to receive the housing flanges when fully connected by their clamp band. The sides of the restraint body notches align with the flanges, and the spacing between the notch sides is greater than the spacing between the housing flanges when fully connected. Thus, the notches will prevent excessive separation of the housing flanges as the clamp band is released as long as the restraint notch maintains its alignment with the flanges.

To insure this alignment, cooperating and complementary surfaces are defined on one of the housing flanges and a notch side engaged therewith wherein axial biasing forces produced by an actuator compression spring imposed on the safety restraint as the housing separates also produces an inward force on the restraint to insure the maintaining of the flanges within the restraint notch. To this end an undercut oblique portion defined on the housing flange associated with the restraint member produces a surface engaging a complementary surface defined on the restraint notch side which results in an inward force vector as axial forces are imposed upon the restraint.

The undercut portion of the flange is best defined by forming the associated flange in a conical configuration converging inwardly in the direction of the other housing portion. The restraint notch side engaging this flange is also of a conical complementary configuration, and this "oblique" orientation of the engaging flange and notch surfaces produces the inward force on the restraint.

At least two restraints must be used, and to evenly distribute the restraining forces on the housing, the restraints are evenly spaced about the brake actuator circumference. Two restraints will be located at diametrically opposed 180° locations. Usually, only two clamp band segments are required to maintain the assembly of the actuator housings, and the restraints, which are of a planar configuration, are located intermediate the ears of opposed clamp band segments and include holes defined therein through which the clamp band bolts may extend.

BRIEF DESCRIPTION OF THE DRAWINGS

The aforementioned objects and advantages of the invention will be apparent from the following description and accompanying drawings wherein.

DESCRIPTION OF THE PREFERRED EMBODIMENT

Figure 1:
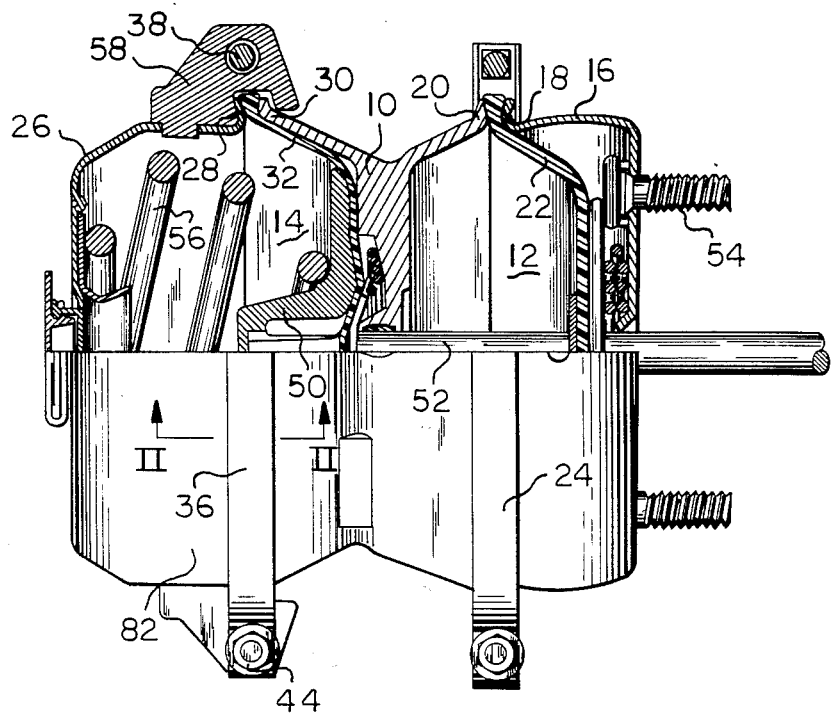
FIG. 1 is an elevational view, the upper portion being shown in section, of a brake actuator housing assembly utilizing the safety restraints of the invention, the housing portions being fully connected.

In FIG. 1 a typical vehicle brake actuator is illustrated with which the safety restraint of the invention may be utilized. The brake actuator includes a bulkhead portion 10 located between chambers 12 and 14. The chamber 12 is defined by the housing portion 16 which includes an outwardly extending radial flange 18 in opposed relationship to the bulkhead flange 20 and the flexible diaphragm 22 is located therebetween. The assembly of the flanges and diaphragm is maintained by the clamp band 24 of the type later described.

Figure 2:
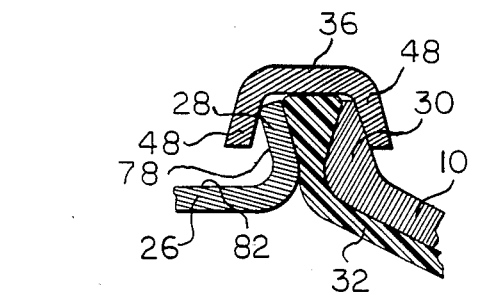
FIG. 2 is an enlarged, detail, elevational, sectional view taken through housing portion flanges along Section II—II of FIG. 1.

The chamber 14 is defined by the bulkhead 10 and the housing portion end cap 26. The end cap includes the radially extending flange 28 while the bulkhead includes the circumferential flange 30, and diaphragm 32 is located between the flanges 28 and 30 and these elements are maintained in a fully clamped relationship by the clamp band segments 34 and 36, FIG. 3, which are contracted by the threaded bolts 38 and 40 cooperating with nuts 42 and 44, respectively, associated with the segment's ears 46. With reference to FIG. 2, the clamp band segments include inwardly extending legs 48 which extend over the flanges of the bulkhead and end cap, and the legs converge outwardly whereby constriction of the segments 34 and 36 axially draws the flanges 28 and 30 toward each other compressing the circumference of the diaphragm 32 therebetween and producing a sealed relationship.

The segments 34 and 36 include radially extending ears 46 at their ends, and the bolts 38 and 40 extend through holes defined in the ears wherein tightening of the nuts 42 and 44 upon the bolts will produce the desired radial contraction of the clamp band segments required to fully clamp the housing portions 10 and 26 in assembled relationship.

Internally, the chamber 14 includes a spring support 50 transmitting force to a piston rod 52 extending through chamber 12 which is operatively connected to the vehicle braking mechanism, not shown. Mounting of the disclosed actuator assembly to the vehicle is accomplished through mounting studs 54, FIG. 1.

A powerful compression spring 56 is located within chamber 14 interposed between the spring support 50 and end cap 26 biasing the piston rod to the right, FIG. 1, and it will be appreciated that an equal opposite force is being imposed upon the end cap 26 toward the left.

Figure 5:
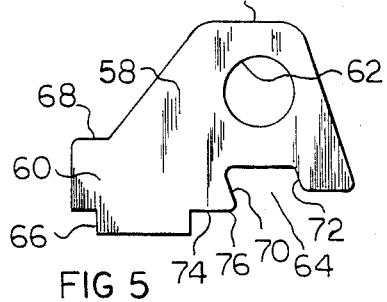
FIG. 5 is an elevational view of the safety restraint body.

The safety restraint devices of the invention constitute a metal planar body 58 of the configuration best appreciated from FIG. 5. The body is preferably formed of stamped steel, and includes a mounting portion 60, a hole 62 for receiving the clamp band bolts, a notch 64 and a tang 66. Additionally, the body is provided with flat surfaces 68 which aid in the staking of the restraint to the actuator end cap 26.

Figure 4:
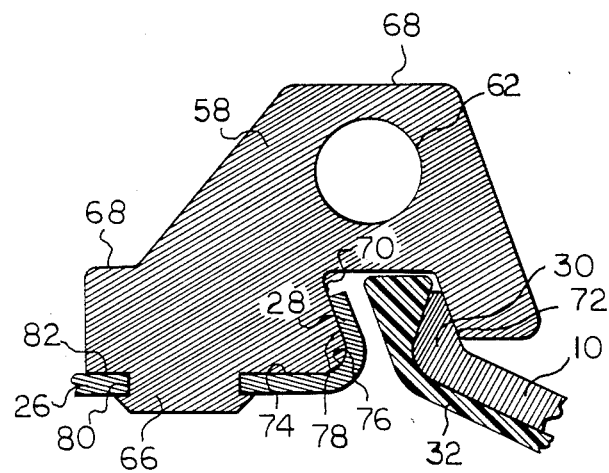
FIG. 4 is a detail, enlarged, sectional, elevational view of the safety restraint and housing flanges illustrating the relationship of the components after release of the clamp band.

The notch 64 is defined by opposed side surfaces 70 and 72, and extends inwardly from the mounting surface 74 a distance sufficient to permit the notch to fully receive the flanges 28 and 30, as will be appreciated from FIGS. 1 and 4. The notch side 72 is obliquely oriented as shown and is of a configuration somewhat corresponding to the configuration of the bulkhead flange 30. The notch side 70 is generally parallel to the side 72, but is of greater radial dimension and is of a configuration as to substantially correspond to the outer surface of the end cap flange 28 as will be noted in FIGS. 1 and 4 and discussed below. The side 70 is radiused at 76 at the intersection with surface 74.

The flange 28 is of a generally conical configuration concentric to the axis of the actuator and the axis of force produced by the spring 56, and the flange converges in a direction toward the bulkhead 10, i.e. to the right, FIG. 1. The "outer" surface 78 of the flange comprises an "undercut" portion obliquely oriented to the axis of the spring force, and as later described, the cooperation of this conical surface with the safety restraint body 58 produces the inward force desired during operation of the restraint.

A rectangular opening 80 is defined in the end cap 26 for closely receiving the tang 66, and during assembly, the restraint body 58 may be supported upon the flat surfaces 68 while the end of the tang 66 is being staked or upset to assure the retention of the restraint tang in the opening 80. As appreciated from FIGS. 1 and 4, the mounting surface 74 will be engaging the outer cylindrical surface 82 of the end cap, and the dimension between the opening 80 and flange 28 corresponds to the dimension between the tank 66 and notch surface 70 wherein the surface 70 will be in engagement with the flange surface 78.

Two restraints 58 are assembled to the end cap 26 in diametrical location to each other, and at the factory the brake actuator will be placed in appropriate assembly fixtures imposing an axial force on the actuator components to compress the spring 56, compress the diaphragms 22 and 32 between their associated housing flanges, and permit the clamp bands 24 and 34-36 to be affixed to the housing flanges to maintain the assembly.

Figure 3:
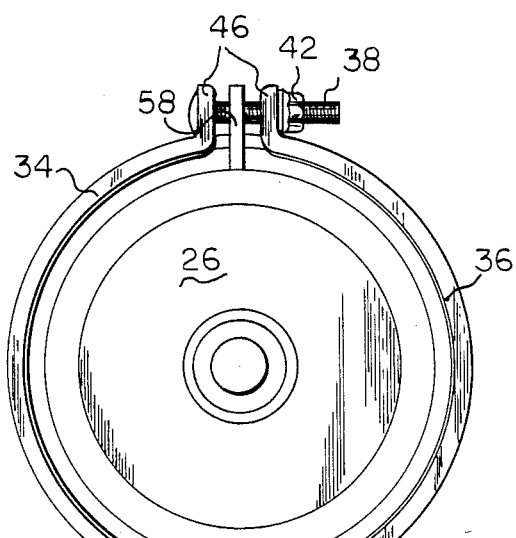
FIG. 3 is an end elevational view as taken from the left of FIG. 1.

The safety restraints 58 must be located between the ears 46 of the clamp band segments 34 and 36 as apparent from FIG. 3, and the holes 62 defined in the restraint bodies will permit the bolts 38 and 40 to extend therethrough. Thus, the restraints do not interfere with the normal assembly of the brake actuator.

As will be appreciated from FIG. 1, the fact that the spacing between the notch sides 70 and 72 is greater than the spacing between the flanges 28 and 30 when fully clamped assures that the restraint will not interfere with the normal assembly of the actuator. The apparatus is then installed on the vehicle and operated in a normal manner.

If bolts 38 and 40 and associated nuts are inadvertently unloosened permitting the clamp band segments 34 and 36 to expand apart the bulkhead housing 10 and the end cap 26 will begin to separate in the axial direction of the force imposed by the spring 56. As the housing portions separate, the bulkhead flange 30 will engage the restraint body notch side 72 as shown in FIG. 4, and an axial force will be imposed upon the restraints by the separating flanges. However, due to the conical configuration or "undercut" configuration, of the flange surface 78, and the complementary configuration of the notch side 70, the force imposed upon the notch side 70 in the axial direction of the spring force will tend to force the restraint body 58 inwardly due to the force vectors produced by the inclination of the surfaces 70 and 78. Thus, this inward force on the restraint body will insure proper radial positioning of the restraint wherein the notch sides 70 and 72 are in alignment with the housing flanges 28 and 30, respectively, in the direction of spring force even if a restraint tang 66 is not firmly affixed to the end cap 26. Of course, the alignment of the notch sides 70 and 72 with the actuator housing flanges, FIG. 4, prevents further separation of the housing portions, and prevents the end cap from being rapidly propelled outwardly due to the spring 56.

From the above, it will be appreciated that the safety restraints disclosed are of economical construction, do not interfere with the normal operation or assembly of the brake actuator, may be economically attached to the actuator and use the spring force to maintain the restraint in the operative position and that alignment of the restraint with the flanges is not dependent upon the attachment of the restraints to the actuator housing.

It is appreciated that various modifications to the disclosed embodiment may be apparent to those skilled in the art without departing from the spirit and scope of the invention.

We claim:

1. A safety restraint for a fluid operated brake actuator having a housing including first and second portions interconnected at outwardly extending flanges defined on each portion, clamping means engaging the flanges and drawing the flanges toward each other, and a compression spring within the housing exerting a biasing force in an axial direction tending to separate the housing portions, the improvement comprising, at least one of the housing portion flanges having an undercut portion extending away from the other housing portion and in the direction of the spring axial force, at least two safety restraint members mounted upon one of the housing portions substantially equally circumferentially spaced thereon and each having a notch defined therein by opposed, spaced, first and second surfaces, the spacing between said surfaces being greater than the spacing between the flanges when fully clamped by the clamping means, said restraint members' notches being inserted over the clamped flanges wherein said first and second surfaces are each in alignment with a flange in the spring force axial direction, said first surface being engagable by said undercut portion of the one flange and of a complementary configuration whereby during release of the clamping means forces exerted on said first surface by said undercut portion in said axial direction force said restraint members inwardly to maintain alignment of said notch second surface with its aligned flange.

2. In a safety restraint for a fluid operated brake actuator as in claim 1, said one of the housing flanges being of a conical configuration concentric to the spring force axial direction and converging in a direction toward the other housing portion whereby said undercut portion is defined by said conical configuration.

3. In a safety restraint for a fluid operated brake actuator as in claim 1, said restraint members each comprising a planar metal body.

4. In a safety restraint for a fluid operated brake actuator as in claim 3, means connecting said planar restraint metal bodies to the housing portion upon which said one housing portion flange having said undercut portion is defined.

5. In a safety restraint for a fluid operated brake actuator as in claim 4, wherein said means connecting said bodies to its associated housing portion includes a rectangular opening defined in the housing portion, a tang defined on said body having a rectangular transverse cross section received within said opening, and tang being upset within said opening to retain said tang therein.

6. In a safety restraint for a fluid operated brake actuator as in claim 1, the clamping means engaging the housing portion flanges comprising at least two circular segments, said segments each including ends defined by outwardly extending ears, the ears of adjacent segments being circumferentially spaced from each, threaded bolts interconnecting adjacent ears, said restraint members being located intermediate said ears.

7. In a safety restraint for a fluid operated brake actuator as in claim 6, said restraint members each comprising a planar metal body.

8. In a safety restraint for a fluid operated brake actuator as in claim 7, means connecting said planar restraint metal bodies to the housing portion upon which said one housing portion flange having said undercut portion is defined.

9. In a safety restraint for a fluid operated brake actuator as in claim 7, a hole defined in each restraint body, the bolts interconnecting adjacent clamping segment ears extending through said restraint body holes.

* * * * *